United States Patent [19]
Carlson et al.

[11] Patent Number: 4,891,196
[45] Date of Patent: Jan. 2, 1990

[54] CHLOROSULFONIC ACID COMPOSITION

[75] Inventors: Norman A. Carlson, Hockessin; Glenn R. Evers, Wilmington, both of Del.

[73] Assignee: E. I. Du Pont de Nemours and Company, Wilmington, Del.

[21] Appl. No.: 942,558

[22] Filed: Dec. 16, 1986

[51] Int. Cl.⁴ .............................................. C01B 17/46
[52] U.S. Cl. ...................................... 423/269; 423/467
[58] Field of Search .................................. 423/269, 467

[56] References Cited

U.S. PATENT DOCUMENTS

| | | | |
|---|---|---|---|
| 1,422,335 | 7/1922 | Briggs | 423/467 |
| 2,187,244 | 1/1940 | Mills | 260/400 |
| 2,311,619 | 2/1943 | Laury | 423/467 |
| 2,377,642 | 6/1945 | Mooney et al. | 423/467 |
| 3,133,946 | 5/1964 | Maurer | 556/139 |
| 3,234,256 | 2/1966 | Kaplan | 260/400 |
| 3,277,145 | 10/1966 | Shull et al. | 260/400 |

FOREIGN PATENT DOCUMENTS 24648  8/1970  Japan ................................. 423/467

OTHER PUBLICATIONS

Kirk–Othmer, *Encyclopedia of Chemical Technology*, 3rd Ed., vol. 5, pp. 873–880.
Sosis et al., "Sulfation of Synthetic Linear Primary Alcohols with Chlorosulfonic Acid", Journal of Amer. Oil Chem. Society, 47, pp. 229–232 (1970).
Chemical Abstract 126,731, vol. 85, p. 182 (1976).
Brauer, Handbook of Preparative Inorganic Chemistry, 2nd ed., vol. 1, pp. 385–386, Academic Press, 1963.

*Primary Examiner*—John Doll
*Assistant Examiner*—Jeffrey Edwin Russel
*Attorney, Agent, or Firm*—Charles E. Krukiel

[57] ABSTRACT

The present invention relates to an improved chlorosulfonic acid (CSA) composition useful in making a high clarity sulfated salt of a $C_{8-22}$ natural or synthetic predominantly straight chain aliphatic primary alcohol to a process for making the improved CSA composition and to improved CSA composition by the process.

The CSA contains less than 1 weight percent sulfuric acid, less than 0.47 weight percent sulfur trioxide, less than 5 parts per million iron and less than 0.5 relative percent pyrosulfuryl chloride.

The CSA process involves contacting the hydrogen chloride and sulfur trioxide at the point of reaction with from 0.75 to 1.5 weight percent sulfuric acid based on the stoichiometric rate of CSA produced from the sulfur trioxide with an excess of hydrogen chloride.

8 Claims, 1 Drawing Sheet

CHLOROSULFONIC ACID COMPOSITION

BACKGROUND OF INVENTION

1. Field of Invention

The present invention relates to an improved chlorosulfonic acid composition useful in making a high clarity sulfated salt of a $C_{8-22}$ natural or synthetic predominantly straight chain aliphatic primary alcohol also referred to as shampoo base or detergent base and to a process for making the improved chlorosulfonic acid composition.

2. Related Art

The soap and detergent industry requires a high clarity base for some of its products so that the coloring agents they add are not adversely effected. The diluted, neutralized sulfated salt of a $C_{8-22}$ natural or synthetic predominantly straight chain aliphatic primary alcohol used as a shampoo base, for example, must be almost "water white", otherwise its normal yellow color would cause a green product to result when blue coloring agents are added. Clarity can be measured by percent light transmittance (%LT). To be almost "water white", the material's percent light transmittance must be greater than 90% when measured at a 425 nanometer (nm) wave length in a 1 cm diameter cell. When the %LT is in the 70's or 80's, the material appears yellow. There are equivalent alternate means for measuring clarity known to those skilled in the art.

The shampoo base is made by first sulfating a $C_{8-22}$ natural or synthetic predominantly straight chain aliphatic primary alcohol, preferably a $C_{12-16}$ lauryl alcohol and most preferably a natural $C_{12-16}$ lauryl alcohol. This sulfation, yielding an alkylsulfuric acid, can be done with chlorosulfonic acid. The alkylsulfuric acid is neutralized by methods known in the art. For example, neutralization can be with an alkali metal base or ammonium base, preferably a hydroxide and most preferably sodium hydroxide or ammonium hydroxide, or an alkanolamine, preferably triethanolamine or diethanolamine to form the sulfated salt of the starting alcohol also referred to as shampoo base or detergent base. The resulting salt is then diluted to meet the shampoo or detergent manufacturer's specification for active ingredient.

It is known that the reaction of chlorosulfonic acid and the alcohol is usually vigorous and exothermic so that localized overheating during admixture of the acid and alcohol are difficult to avoid. Such overheating results in undesirable side reactions and decomposition leading to low yields and discoloration.

U.S Pat. No. 2,187,244 to Mills teaches a continuous process of directly mixing the acid and alcohol without temperature constraint followed by promptly arresting the reaction by cooling or neutralization as soon as the desired reaction has progressed to the desired extent and before the undesirable side reactions have taken place to a substantial extent to produce a light-colored product.

U.S. Pat. No. 3,234,256 to Kaplan teaches an apparatus and a process for maximizing dispersion of the acid stream in the alcohol by injecting a thin stream of the acid into the alcohol through one orifice below the surface of the acid. Simultaneously, a high velocity inert gas stream from a second orifice adjacent to the first orifice impinges on the acid stream so as to atomize it within the liquid to yield an improved-color product. Temperature is controlled between 10 and 100° C and most preferably at 35 to 65° C.

U.S. Pat. No. 3,277,145 to Schull, et al. teaches an apparatus and a process for facilitating control of temperature by spraying the chlorosulfonic acid into a highly turbulent confined stream of inert gas mixed with the alcohol in liquid phase so as to yield a turbulent froth which is maintained until esterification is complete. Temperature is controlled between 5 and 100° C and most preferably at 35 to 40° C.

U.S. Pat. No. 3,133,946 to Maurer, et al. teaches a method of purifying the alkylsulfuric acid made by reacting chlorosulfonic acid and an n-alkanol in an organic, low boiling solvent at low temperatures. The n-alkanol has the formula ROH wherein R is an n-alkyl group having from 12 to 22 carbon atoms. The reaction solution is cooled to below about 0° C to crystallize the alkylsulfuric acid which is rapidly separated to recover a substantially pure material which can, in turn, be reacted to form a salt for use as a shampoo base.

A common technique for improving the %LT of the shampoo base is to bleach the final product with bleaching agents such as hydrogen peroxide. This bleaching procedure is undesirable due to added cost and reduced productivity brought about by the added processing step. Also, certain sulfated salts such as amine lauryl sulfates cannot be successfully bleached to the desired %LT by this method without generating undesired side products which, for example, prevent use in cosmetic applications.

The chlorosulfonic acid (CSA) used to sulfate the alcohol is made by reacting anhydrous hydrogen chloride and sulfur trioxide. U.S. Pat. No. 2,377,642 to Mooney et al. teaches an improved process for manufacturing CSA. Mooney et al. teach that it is known to produce CSA by mixing sulfur trioxide-containing gases with hydrochloric acid-containing gases with cooling and that it is advantageous to keep the temperature at about 70° C and certainly not above 100° C to prevent the formation of pyrosulfuryl chloride (PSC). Mooney et al. teach a continuous reaction with the sulfur trioxide in excess, condensation of the CSA, and then contacting the condensed CSA with a hydrogen chloride-containing gas to convert any sulfur trioxide that dissolved in the CSA to CSA. The mixed reaction gases, after separation of the liquid CSA, are preferably treated to recover CSA remaining as a mist and then contacted with 95-98% sulfuric acid to recover sulfur trioxide values.

U.S. Pat. No. 2,311,619 to N. A. Laury teaches a process wherein the sulfur trioxide and hydrogen chloride are reacted in the presence of chlorosulfonic acid as a solvent at about 98° C.

Japanese Patent Publication No. 7,024,648-R assigned to Mitsubishi Chemical Industry, Ltd., teaches a high temperature process for manufacturing CSA. Gaseous sulfur trioxide and gaseous hydrogen chloride react at a temperature of 151.3-153° C to produce gaseous CSA which is then condensed. A portion of the condensed CSA is recycled to the reaction tower and a portion is diverted to a decomposition vessel where the by-product pyrosulfuryl chloride (PSC) is decomposed by adding 1.0-3.0% anhydrous sulfuric acid and 15-22 cubic meters per hour of anhydrous hydrogen chloride.

SUMMARY OF THE INVENTION

The present invention relates to an improved CSA composition containing less than about 1.0 weight percent sulfuric acid, less than 0.47 weight percent sulfur trioxide, less the 5 parts per million (ppm) iron and from less than about 0.3 relative percent PSC. Chlorsulfonic acid having this level of impurities will consistently produce a clear water white shampoo base, that is a shampoo base with a %LT of greater than 90%, and preferably greater than 95%, at 425 nm wavelength when measured in a 1 cm cell. Alternative methods of measuring light transmittance may be used.

The invention also relates to a novel process for producing the improved CSA and to CSA made according to that process. The process involves reacting hydrogen chloride gas with concentrated sulfur trioxide, preferably in the presence of CSA liquid, in a well mixed reactor wherein an excess of hydrogen chloride is maintained in the reaction vessel and sulfuric acid is brought into intimate contact with the hydrogen chloride and sulfur trioxide in the reaction liquid at the point of reaction between the hydrogen chloride and the sulfur trioxide. The hydrogen chloride gas is preferably anhydrous but some moisture is not harmful since it will produce sulfuric acid in situ.

Preferably, the improved CSA is made according to the process of this invention and contains the following levels of what have heretofore been considered impurities:
  a. 0.55–1.0 weight percent of sulfuric acid,
  b. 0.05–0.47 weight percent sulfur trioxide,
  c. less than 5 ppm iron, and
  d. less than 0.5 relative percent pyrosulfuryl chloride.

FIGURE

FIG. 1 is a block diagram depicting a CSA reactor system in which the hydrogen chloride and the sulfur trioxide are reacted in the presence of CSA as a solvent.

DETAILED DESCRIPTION OF THE INVENTION

Figure 1:
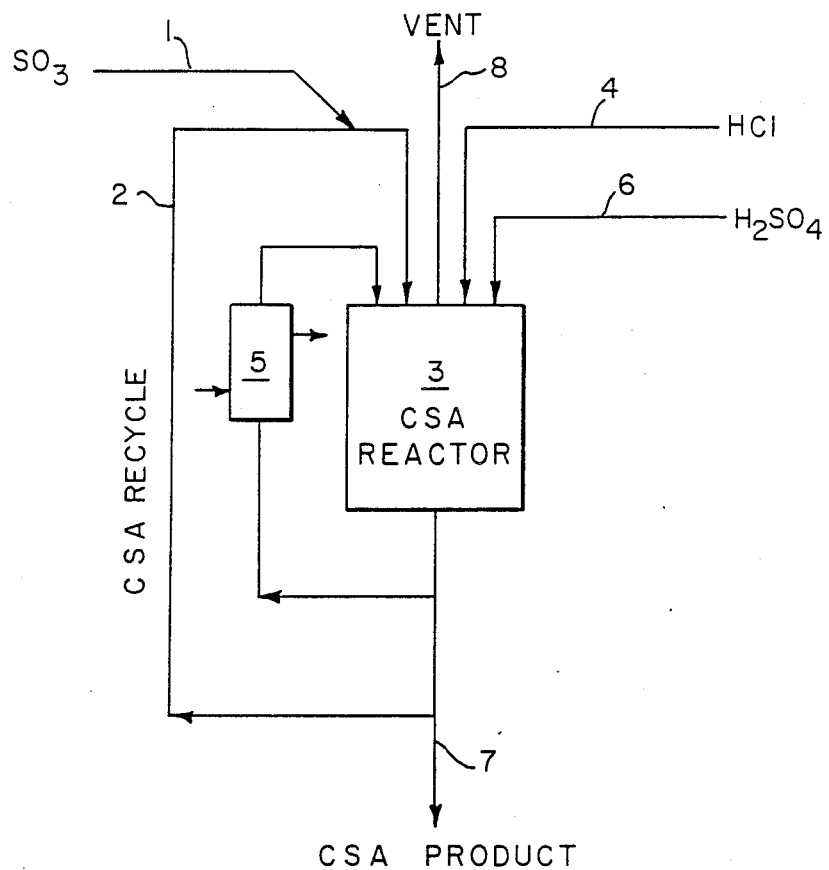

The improved chlorosulfonic acid composition of this invention has the following levels of impurities:
  a. 0–1.0 weight percent sulfuric acid,
  b. 0–0.47 weight percent sulfur trioxide,
  c. 0–5 parts per million (ppm) iron,
  d. 0–0.3 relative percent pyrosulfuryl chloride.

Preferably, the improved chlorosulfonic acid composition of this invention has the following levels of impurities:
  a. 0–0.55 weight percent sulfuric acid,
  b. 0.05–0.25 weight percent sulfur trioxide,
  c. 0–5 parts per million (ppm) iron,
  d. 0–0.2 relative percent pyrosulfuryl chloride.

Relative percent pyrosulfuryl chloride is determined by the method described below. Actual weight percentage can be determined by making a standard with a known weight percent pyrosulfuryl chloride, analyzing it on the same infrared spectrophotometer and comparing the resulting peaks.

It is well known in the art that excess iron will cause discoloration when the chlorosulfonic acid is reacted with the $C_{8-22}$ alcohol to make the shampoo base. For this reason, the iron levels should be maintained at less than about 5 parts per million.

It has now been found that the percent light transmittance of the shampoo base made by sulfating a $C_{8-22}$ alcohol with CSA and neutralizing it depends on the combined concentrations of sulfur trioxide, pyrosulfuryl chloride and sulfuric acid in the CSA and on how the CSA is made. The percent sulfur trioxide alone, the relative percent pyrosulfuryl chloride alone or the percent sulfuric acid alone do not correlate with the percent light transmittance. Even if the relative percent pyrosulfuryl chloride is less than 0.3%, the percent light transmittance precipitously declines when the percent sulfur trioxide exceeds 0.47%. If the percent sulfur trioxide is less than 0.47%, the percent light transmittance also declines, but not quite so precipitously when the relative percent pyrosulfuryl chloride exceeds about 0.3 to 0.5 depending on the sulfuric acid concentration and on how the CSA is made. When the CSA is made according to the process of this invention and the sulfuric acid is present in the 0.55 to 1.0 range, the higher level of pyrosulfuryl chloride can be tolerated.

Sulfuric acid reduces the efficiency of CSA in sulfating the alcohol and can cause a darker product. Therefore, the weight percent in the CSA should be kept below about 1.0% based on CSA to assure a clarity of greater than 90% light transmittance at 425nm using a 1 cm diameter cell. The preferred concentration of sulfuric acid in CSA not made by the process of this invention is about 0 to 0.55 weight percent. When the CSA is made by the process of this invention, the preferred concentration is about 0.55 to 0.65 weight percent.

Sulfur trioxide should be less than 0.47% or the percent light transmittance of the shampoo base made with the CSA will fall off precipitously. The percent sulfur trioxide preferably should be greater than 0.05 to prevent excessive corrosion of steel and stainless steel used in the CSA system.

The pyrosulfuryl chloride should be less than 0.3 relative percent and preferably less than 0.2 relative percent, particularly if the CSA is not made by the process of this invention. If the CSA is made by the process of this invention, pyrosulfuryl chloride levels as high as 0.5 relative percent are satisfactory. Lower levels of pyrosulfuryl chloride in CSA tend to result in a more water white shampoo base. Pyrosulfuryl chloride levels have been found to decrease when the CSA is aged which naturally occurs due to the time it generally takes to ship the CSA to the shampoo base manufacturer. Lower pyrosulfuryl chloride levels result upon aging when the percent pyrosulfuryl chloride starting concentration is low.

Referring to FIG. 1, concentrated sulfur trioxide ($SO_3$) (1) is mixed with liquid CSA being recirculated through line (2) from the well-mixed reactor tank (3) at a point as close as possible prior to the introduction of anhydrous hydrogen chloride. The $SO_3$/CSA mixture is fed back to the reactor tank (3) through a dipleg. It is contacted with incoming anhydrous hydrogen chloride gas (A-HCl) fed through line (4). A greater than stoichiometric amount of A-HCl is sparged into the reactor tank (3) through line (4). The temperature of the reactor liquid is controlled by cooling by circulating part of the reaction liquid through a cooler (5). Alternate means of cooling can be employed. Sulfuric acid or a chemical such as water or hydrogen peroxide which will react to form sulfuric acid in situ is injected into the reactor through line (6). Product CSA is removed from the system through line (7). Reaction gases are scrubbed in the vent system (8).

The sulfur trioxide concentration in the CSA should be selected to minimize pyrosulfuryl chloride (PSC) formation that results from $SO_3$ reacting with CSA while at the same time providing enough $SO_3$ to react with the hydrogen chloride to make CSA at economic rates and yield. Preferably the sulfur trioxide concentration should be about 10 weight percent.

The rate of hydrogen chloride feed should be controlled at slightly greater than the stoichiometric amount needed to react all the sulfur trioxide to assure as complete a reaction of the sulfur trioxide to CSA as possible. The rate should not be too much in excess of the stoichiometric amount to avoid the need for excessive scrubbing of the vent gases from the reactor. The preferred range for the hydrogen chloride is from about 100 to 110 percent of the stoichiometric amount. The hydrogen chloride in this process does not have to be dry since the water will react to form sulfuric acid in situ. It is preferably anhydrous to simplify the calculation of the necessary amount of sulfuric acid or chemical to make sulfuric acid in situ and to avoid excessive equipment corrosion.

The rate of 93 weight percent sulfuric acid addition at steady state should be between 0.75 and 1.5 weight percent and preferably at less than 1.0 weight percent of the stoichiometric amount of CSA that the sulfur trioxide should be producing. Exceeding this range for short periods of time to facilitate getting the reaction system to steady state quickly is not outside the intended scope of this invention. Operating at levels lower than this range will result in a product that will not meet the objective of improved shampoo base color.

The sulfuric acid can be made in situ by injecting a chemical such as water or hydrogen peroxide. One skilled in the art can easily determine the flow rates needed to get the required amount of sulfuric acid at the point of reaction between the hydrogen chloride and the sulfur trioxide.

The temperature of the reaction should be kept as low as possible to prevent the formation of PSC but high enough for the desired reaction forming CSA to take place at sufficient rate. The temperature should be about 65 to 80.C, and preferably should be about 70° C.

Also in a gas-phase reactor system such as is taught in U.S. Pat. No. 2,377,642, the process would be expected to work by injecting sulfuric acid mist or a gas or mist such as steam which would react to make sulfuric acid in situ with the hydrogen chloride and sulfur trioxide containing gases so long as the temperature of the reaction mass can quickly be reduced to about 65 to 80.C preferably to about 70° C.

Preferably, the CSA produced will be aged for one to two weeks or longer. That is, the CSA will be permitted to remain in storage for one to two weeks or longer following production before it is used to sulfate the alcohol.

EXAMPLES

To more fully illustrate the invention and not to limit it, the following examples are offered.

Preparation of Shampoo Base and Measurement of Light Transmittance

To evaluate the CSA in the examples, the following procedure was used. The CSA samples were reacted with a natural lauryl alcohol and neutralized with triethanolamine. The resulting material was diluted with deionized water to make a shampoo base which was analyzed for percent light transmittance. All equipment was clean and dry before starting the procedure.

The procedure closely replicates a plant process designed to optimize temperature control and mixing. The process can be run in a plant according to known technology with any $C_{8-22}$ alcohol and any known neutralizing agent.

Step 1. Weigh 106.0 grams of a natural lauryl alcohol into a 500 milliliter (ml) resin flask equipped with a four-neck top containing a thermometer, a 1-15/16 ×5/8 inch semicircular Teflon ® paddle agitator inserted through a seal lubricated with Krytox ® grease, an inlet tube for injecting the CSA, and a glass tube for sparging dry nitrogen below the surface of the liquid. One of the necks also is equipped with a vent to allow hydrogen chloride gases generated in the reaction and nitrogen to exit the flask.

Step 2. Place flask into a temperature control bath.

Step 3. Purge the flask with about 85 milliliters per minute (ml./min.) of dry nitrogen while agitating the alcohol with the agitator running at about 545 rpm and while maintaining an alcohol temperature of about 28 to 30.C for about one half hour.

Step 4. Load a glass syringe with 35 ml. (64.6 grams) of the CSA to be tested, attach a Teflon ® needle (a 20 to 22 gauge flexible tube, and insert needle into the CSA inlet tube so that the tip is as close as possible to the agitator blade.

Step 5. Start the CSA feed at 0.3 ml./min. using a syringe pump while maintaining the reaction temperature at 28–30° C and the nitrogen purge at 85 ml./min.

Step 6. When the CSA syringe is empty, pull the needle out of the reaction liquid and allow it to drain.

Step 7. Agitate for 10 minutes while maintaining the 28 to 30.C temperature and the 85 ml./min. nitrogen purge.

Step 8. Add 28 grams of the resulting reaction mass dropwise using a dropping funnel into a mixture of 24.5 grams triethanolamine and about 0.5 ml. of a clear chelating agent (tri-sodium salt of hydroxyethylethylenediamine triacetic acid as a 30 weight percent solution in water), which is in a glass flask equipped with a thermometer and an agitator, the flask being in a temperature control bath. The addition is made while maintaining good agitation and while controlling the temperature below 30° C.

Step 9. Add 69 grams of deionized water after the 28 grams of reaction mass has been added, mix well and allow to stand until all the bubbles disappear.

Step 10. Measure the light transmittance of the resulting material at 425 nm wave length in a 1 cm cell using a spectrophotometer and compare to the starting natural lauryl alcohol as the standard. The natural lauryl alcohol has a percent light transmittance of 97% at the same wavelength using the same equipment and cell when compared to distilled water.

Procedure for Determining Relative Percent Pyrosulfuryl Chloride

The following procedure was used to determine the relative percent pyrosulfuryl chloride:

1. Accurately measure a 5 ml sample of CSA and immediately transfer to a 125 ml Erlenmeyer flask containing 10 g. of anhydrous NaCl. Immediately fit the flask with a drying tube and mix the contents of the flask thoroughly by shaking. Allow to react for 2 hours while periodically shaking the mixture. An excess of 10–20 % anhydrous NaCl is desirable for the conversion of CSA to its sodium salt.

2. Add 8 ml of $CCl_4$ (dry). Stir or shake the flask thoroughly for 5 minutes. Decant the $CCl_4$ through a small fluted filter paper into a 25 ml volumetric flask.

3. Repeat the extraction with two additional portions of CCl₄, decanting the CCl₄ after each extraction into the 25 ml flask. Dilute to the mark with CCl₄, stopper and mix thoroughly. Pyrosulfuryl chloride is extremely hygroscopic and is stable only in the complete absence of moisture. Minimize exposure of all samples to air or moisture.

4. Run a spectrum on the Nicolet 7199 FTIR instrument at 4 cm$^{-1}$ resolution, averaging 100 interferograms per spectrum. Use a 0.4 mm (nominal) cell path (NaCl windows) ratioing against pure carbon tetrachloride background.

5. Print the spectral region. Spectrum range is 1250 to 1667 cm$^{-1}$ wave numbers or 8.0 microns to 6.0 microns wavelength, plotting wave number versus absorbance (−0.1 to 0.9).

6. The intensity of the absorbance peak at 1460 cm$^{-1}$ ($A_{1460}$) is measured to a baseline. The concentration of PSC is approximated using the equation:

$$\text{Rel \% PSC} = 2 \times A_{1460} \quad (1)$$

The factor of 2 in Equation 1 is based on a previously developed calibration constant and therefore the equation is only an approximation. These results will be correct relative to one another.

EXAMPLES

All of the examples producing CSA were run in plant-scale equipment configured as in FIG. 1. The first two examples show the operation without the injection of sulfuric acid. Examples 3 to 11 show the effect of adding less that 0.5 weight percent sulfuric acid (as 93 weight percent sulfuric acid) based on the stoichiometric CSA production rate calculated based on sulfur trioxide feed. Examples 12 to 18 show the effect of increasing the weight percent sulfuric acid to more than 1.0%. All examples were part of a continuous three-day run. Throughout the run, all conditions with the exception of sulfuric acid flow were kept as constant as possible. The reaction temperature was controlled at about 70° C, the sulfur trioxide flowing into the reactor was maintained at about 10 weight percent in CSA, anhydrous hydrogen chloride flow was controlled at 105 weight percent of stoichiometric, and the stoichiometric CSA production rate was about 3700 pounds per hour.

No sulfuric acid (as 93 weight percent sulfuric acid) was added to the reactor until after Example 2. Example 1 shows 0.05 weight percent sulfuric acid (as 100% sulfuric acid) in the reactor probably as a result of some moisture being carried into the reactor with one of the gas streams. Due to sulfuric acid pump problems, the exact flow of sulfuric acid during Examples 3 to 11 is not known, but is known to have been erratic and, based on spot checks made by temporarily diverting the acid to a container for a measured time and by dividing the quantity collected by the time, to not have exceeded 0.5 weight percent (as 93% sulfuric acid) of the CSA flow. Since the reactor is a continuous stirred reactor, it can take several hours to reach steady state. The flow of sulfuric acid was increased to about 2.1 weight percent between Examples 11 and 12 to allow the reactor to reach steady state quickly. It was subsequently lowered to the feed rates shown in the following table.

Samples of CSA being produced were analyzed for weight percent sulfur trioxide, sulfuric acid, and iron and for relative percent pyrosulfuryl chloride (PSC) within two days after being taken. In some cases, the relative percent PSC was determined again after about 3 weeks using the procedure described above. Shampoo base was made from the CSA produced in each example and the percent light transmittance in each case was determined using the procedure described above.

Weight percent sulfuric acid reported in the chlorosulfonic acid concentration is on a 100% basis. Weight percent sulfuric acid fed to the reactor is on a 93% basis.

EXAMPLE RESULTS

| Ex. | H₂SO₄[1] Feed Rate | Smpl. taken Day | Smpl. taken Time | Shampoo Base[2] % LT (Day tested) | Rel % PSC 2 day age | Rel % PSC 3 week age | % SO₃ | % H₂SO₄ | ppm iron |
|---|---|---|---|---|---|---|---|---|---|
| 1 | 0 | 1 | 6:00 a | 92 (15) | 1.02 | not tested | 0.28 | 0.05 | 0.4 |
| 2 | 0 | 1 | 11:38 a | 94 (3) | 0.96 | 0.43 | 0.37 | 0.00 | 0.3 |
| 3 | <0.5 | 1 | 3:00 p | 94 (18) | 0.94 | not tested | 0.37 | 0.00 | — |
| 4 | <0.5 | 1 | 7:00 p | 90 (22) | 0.80 | 0.52 | 0.40 | 0.00 | — |
| 5 | <0.5 | 1 | 9:00 p | 85 (2) | 0.80 | not tested | 0.25 | 0.33 | — |
| 6 | <0.5 | 2 | 12:00 a | 89 (7) | 0.74 | not tested | 0.28 | 0.21 | — |
| 7 | <0.5 | 2 | 3:00 a | 2 (31) | 0.81 | not tested | 0.31 | 0.18 | — |
| 8 | <0.5 | 2 | 6:00 a | 64 (31) | 0.92 | not tested | 0.25 | 0.06 | — |
| 9 | <0.5 | 2 | 9:00 a | 77 (31) | 1.07 | not tested | 0.34 | 0.17 | — |
| 10 | <0.5 | 2 | 12:00 p | 87 (8) | 0.82 | not tested | 0.25 | 0.29 | 0.4 |
| 10 | <0.5 | 2 | 12:00 p | 93 (21) | 0.82 | not tested | 0.25 | 0.29 | 0.4 |
| 11 | 2 | 2 | 3:00 p | 71 (14) | 1.10 | 0.35 | 0.19 | 0.12 | — |
| 12 | <2.12 | 2 | 6:00 p | 92 (14) | 0.86 | 0.05 | 0.40 | 0.21 | — |
| 13 | <2.12 | 2 | 9:00 p | 98 | 0.37 | 0.05 | 0.31 | 0.91 | — |

-continued

| Ex. | H₂SO₄¹ Feed Rate | Smpl. taken Day | Time | Shampoo Base² % LT (Day tested) | Rel % PSC 2 day age | Rel % PSC 3 week age | % SO₃ | % H₂SO₄ | ppm iron |
|---|---|---|---|---|---|---|---|---|---|
| 14 | <1.05 | 3 | 12:00 a | 99 (6) | 0.39 | 0.02 | 0.34 | 0.75 | — |
| 15 | <1.05 | 3 | 3:00 a | 95 (7) | 0.38 | 0.05 | 0.34 | 0.75 | — |
| 15A | <1.05 | 3 | 3:00 a | 99 (8) | 0.38 | 0.05 | 0.34 | 0.75 | — |
| 16 | <1.05 | 3 | 6:00 a | 96 (32) | 0.49 | 0.06 | 0.25 | 1.02 | — |
| 17 | <1.05 | 3 | 9:00 a | 76³ (3) | 0.48 | 0.05 | 0.31 | 0.65 | — |
| 17A | <1.05 | 3 | 9:00 a | 98 (4) | 0.48 | 0.05 | 0.31 | 0.65 | — |
| 18 | <1.16 | 3 | 12:00 p | 97 (32)(5) | 0.50 | 0.06 | 0.31 | 0.78 | — |

¹Sulfuric Acid Feed as weight percent (based on 93% sulfuric acid) of stoichiometric CSA being produced.
²Laboratory prepared shampoo base made by neutralizing a CSA sulfated natural lauryl alcohol (Proctor & Gamble lauryl alcohol CO-1214) with triethanolamine.
³Sample contained solids from agitator seal leak on the resin flask but had no appearance of yellow.

We claim:

1. A process for making an improved chlorosulfonic acid which comprises causing hydrogen chloride and sulfur trioxide to react in the presence of chlorosulfonic acid at a temperature of 65 to 80° C wherein the hydrogen chloride is present at from about 100 to 110 weight percent of stoichiometric quantities and 0.75 to 1.5 weight percent sulfuric acid (as 93% sulfuric acid) based on the stoichiometric rate of chlorosulfonic acid production is injected into the reactor at the point of reaction between the hydrogen chloride and the sulfur trioxide.

2. The process of claim 1 further comprising the step of aging the improved chlorosulfonic acid for more than one week.

3. An improved chlorosulfonic acid containing the following levels of impurities:
   a. 0 to 1.0 weight percent sulfuric acid,
   b. 0.05 to 0.47 weight percent sulfur trioxide,
   c. 0 to 5 parts per million iron, and
   d. 0 to 0.3 relative percent pyrosulfuryl chloride.

4. The improved chlorosulfonic acid of claim 3 made by the process of claim 1 wherein the weight percent sulfuric acid is between 0.55 and 1.0.

5. The improved chlorosulfonic acid of claim 4 made by the process of claim 1 wherein the weight percent sulfuric acid is between 0.55 and 0.65.

6. The improved chlorosulfonic acid of claim 3 made by the process of claim 1 wherein the weight percent sulfuric acid is between 0.55 and 1.0.

7. The improved chlorosulfonic acid of claim 3 made by the process of claim 1 wherein the weight percent sulfuric acid is between 0.55 and 0.65.

8. The improved chlorosulfonic acid of claim 3 wherein the level of impurities is:
   a. 0 to 0.55 weight percent sulfuric acid
   b. 0.05 to 0.25 weight percent sulfur trioxide,
   c. 0 to 5 parts per million iron, and
   d. 0 to 0.2 relative percent pyrosulfuryl chloride.

* * * * *